United States Patent
Tsuchiya

(10) Patent No.: US 9,838,605 B2
(45) Date of Patent: Dec. 5, 2017

(54) CAMERA SYSTEM

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/212,919

(22) Filed: Jul. 18, 2016

(65) Prior Publication Data
US 2016/0330378 A1 Nov. 10, 2016

Related U.S. Application Data

(63) Continuation of application No. PCT/JP2015/050126, filed on Jan. 6, 2015.

(30) Foreign Application Priority Data

Jan. 30, 2014 (JP) .................................. 2014-015762

(51) Int. Cl.
*H04N 5/228* (2006.01)
*H04N 5/232* (2006.01)
(Continued)

(52) U.S. Cl.
CPC ........... *H04N 5/23287* (2013.01); *G03B 5/00* (2013.01); *G03B 17/14* (2013.01); *H04N 5/2254* (2013.01);
(Continued)

(58) Field of Classification Search
CPC ............. H04N 5/23264; H04N 5/2328; H04N 5/23287
(Continued)

(56) References Cited

U.S. PATENT DOCUMENTS

2005/0140793 A1* 6/2005 Kojima ............... H04N 5/23287
348/208.99
2006/0110147 A1* 5/2006 Tomita ............... H04N 5/23212
396/55
(Continued)

FOREIGN PATENT DOCUMENTS

| JP | H07-104338 A | 4/1995 |
| JP | 2006-126668 A | 5/2006 |
| JP | 2009-075221 A | 4/2009 |

OTHER PUBLICATIONS

International Search Report mailed in corresponding International Patent Application No. PCT/JP2015/050126 dated Mar. 31, 2015, consisting of 1 pp. (English Translation Provided).

*Primary Examiner* — Anthony J Daniels
(74) *Attorney, Agent, or Firm* — Volpe and Koenig, P.C.

(57) ABSTRACT

In a camera system that includes a lens unit and a camera body, the camera body includes a blur correcting unit that performs blur correction in a plurality of directions, and a determining unit that determines whether the lens unit mounted onto the camera body is a lens unit that performs the blur correction in the plurality of directions. When the determining unit determines that the mounted lens unit is the lens unit that performs the blur correction in the plurality of directions, the camera body performs the blur correction in the plurality of directions at a camera body side blur correction ratio, and the lens unit performs the blur correction in the plurality of directions at a lens unit side blur correction ratio.

5 Claims, 11 Drawing Sheets

(51) Int. Cl.
*G03B 5/00* (2006.01)
*G03B 17/14* (2006.01)
*H04N 5/225* (2006.01)

(52) U.S. Cl.
CPC ..... *H04N 5/23209* (2013.01); *H04N 5/23258* (2013.01); *G03B 2205/0007* (2013.01)

(58) Field of Classification Search
USPC ........................................................ 348/208.5
See application file for complete search history.

(56) References Cited

U.S. PATENT DOCUMENTS

| 2010/0194897 A1* | 8/2010 | Yumiki ................. | G03B 7/091 |
| | | | 348/208.4 |
| 2011/0001858 A1* | 1/2011 | Shintani ................. | G02B 7/28 |
| | | | 348/294 |
| 2014/0049658 A1* | 2/2014 | Yamazaki .......... | H04N 5/23254 |
| | | | 348/208.11 |

* cited by examiner

CAMERA SYSTEM

CROSS-REFERENCE TO RELATED APPLICATIONS

This application is based upon and claims the benefit of priority of the prior Japanese Patent Application No. 2014-015762, filed Jan. 30, 2014, the entire contents of which are incorporated herein by reference.

This is a Continuation Application of PCT Application No. PCT/JP2015/050126, filed Jan. 6, 2015, which was not published under PCT Article 21(2) in English.

FIELD

The present invention relates to a camera system that includes a lens unit and a camera body that the lens unit can be attached to or detached from, and in particular, a camera system having a blur correction function for correcting an image blur caused by camera shake or the like.

BACKGROUND

In recent years, cameras equipped with a blur correction function for correcting an image blur caused by camera shake or the like (hereinafter also referred to as an "image stabilization function") have become popular, and a photographer can capture a satisfactory image having no image blurring without paying any special attention to camera shake or the like.

As an example, there are two types of camera systems of a lens-interchangeable camera in which photographing lenses can be interchanged according to the purpose of photographing: a camera system in which the image stabilization function is installed onto an interchangeable lens; and a camera system in which the image stabilization function is installed onto a camera body. When the image stabilization function is installed onto an interchangeable lens, a sensor to detect the movement of a camera is mounted onto the interchangeable lens, and a portion of a photographing lens group is moved in a direction in which a detected camera shake is cancelled such that image stabilization is performed. When the image stabilization function is installed onto a camera body, a sensor to detect the movement of a camera is mounted onto the camera body, and an image sensor is moved in a direction in which a detected camera shake is cancelled such that image stabilization is performed. Whether the image stabilization function is installed onto the interchangeable lens or the camera body depends on a camera system or a manufacturer, because both types of camera systems have advantages and disadvantages.

In some of the camera systems having a common standard, both an interchangeable lens and a camera body have the image stabilization function.

As an example, a technology is known in which, in a camera system that includes an interchangeable lens including a blur correction system, an anti-vibration converter (a converter incorporating an image blur correction device), and a camera body, the interchangeable lens and the anti-vibration converter correct blurring at a ratio of 1:1, namely, each of the interchangeable lens and the anti-vibration converter corrects half of a blur amount (see Japanese Laid-Open Patent Publication No. 7-104338 and the like). In the technology above, inconvenience is not generated due to blur correction performed simultaneously by the interchangeable lens and the anti-vibration converter, and a photographer is not likely to fail in photographing. In this technology, the interchangeable lens and the converter perform blur correction, but a similar effect can be achieved even when the interchangeable lens and the camera body perform blur correction.

SUMMARY

In an aspect of the present invention, a camera system is provided that includes a lens unit and a camera body that the lens unit is freely attached to or detached from. The camera body includes a blur correcting unit that performs blur correction in a plurality of directions, and a determining unit that determines whether the lens unit mounted onto the camera body is a lens unit that performs the blur correction in the plurality of directions. When the determining unit determines that the mounted lens unit is the lens unit that performs the blur correction in the plurality of directions, the camera body drives the blur correcting unit so as to perform the blur correction in the plurality of directions at a camera body side blur correction ratio based on information relating to a blur correction range that the lens unit has, a correction sensitivity, and the blur correction range included in the camera body, and the lens unit performs the blur correction at a lens unit side blur correction ratio based on the information relating to the blur correction range that the lens unit has, the correction sensitivity, and the blur correction range included in the camera body. When $L\_b$ represents the blur correction range included in the camera body, $L\_l$ represents the blur correction range that the lens unit has, and K represents the correction sensitivity, the camera body side blur correction ratio is a value obtained by performing an operation of $L\_b/(L\_b+L\_l \times K)$, and the lens unit side blur correction ratio is a value obtained by performing an operation of $L\_l/(L\_b+L\_l \times K)$.

DESCRIPTION OF EMBODIMENTS

An embodiment of the present invention is described below with reference to the drawings.

First, directions of a camera system according to the embodiment described below are defined.

Figure 1:
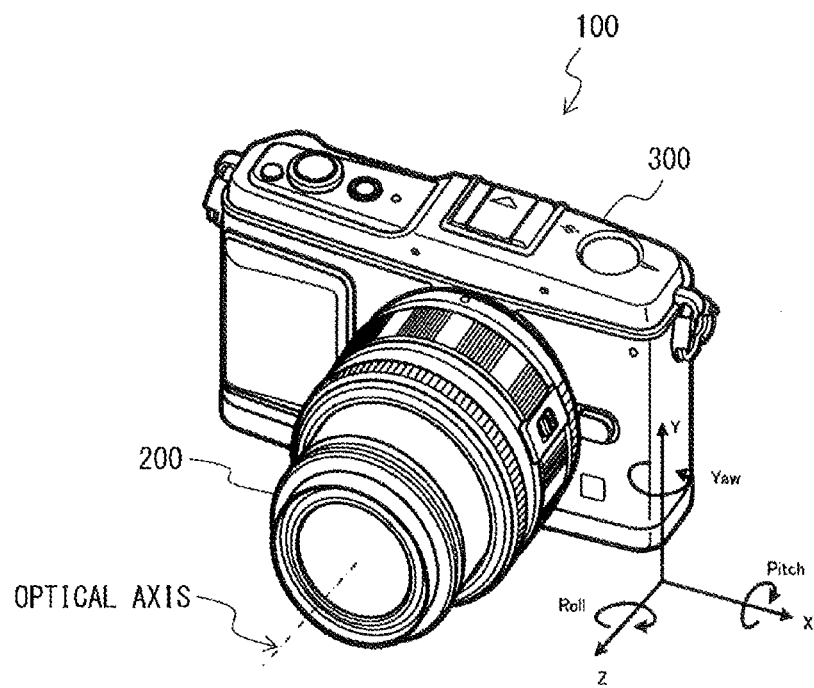
FIG. 1 is a diagram explaining directions of a camera system according to an embodiment.

FIG. 1 illustrates the directions.

As illustrated in FIG. 1, a camera system 100 according to the embodiment has a configuration in which a lens unit 200 is mounted onto a camera body 300. In the camera system 100, an X direction, a Y direction, a Z direction, a pitch direction, a yaw direction and a roll direction are defined as below.

Rightward and leftward directions (a horizontal direction) of the camera body 300 mounted with the lens unit 200 are defined to be an X direction. For convenience of explanation, a rightward direction when viewing the camera system 100 from the front is defined to be a + (plus, positive) direction (a +X direction), and a leftward direction is defined to be a − (minus, negative) direction (a −X direction). The X direction corresponds to rightward and leftward directions of an imaging plane of an image sensor described later.

Upward and downward directions (a vertical direction) of the camera body 300 mounted with the lens unit 200 are defined to be a Y direction. For convenience of explanation, the upward direction is defined to be a + direction (a +Y direction), and the downward direction is defined to be a − direction (a −Y direction). The Y direction corresponds to upward and downward directions of the imaging plane of the image sensor described later.

An optical-axis direction of the camera body 300 mounted with the lens unit 200 is defined to be a Z direction. For convenience of explanation, a direction from a back surface to a front surface of the camera system 100 is defined to be a + direction (a +Z direction), and a direction from the front surface to the back surface of the camera system 100 is defined to be a − direction (a −Z direction).

A rotation direction with an X-direction axis as a rotary shaft is defined to be a pitch direction. For convenience of explanation, a leftward rotation with respect to the +X direction is defined to a + direction (a +pitch direction), and a rightward rotation with respect to the +X direction is defined to be a − direction (a −pitch direction).

A rotation direction with a Y-direction axis as a rotary shaft is defined to be a yaw direction. For convenience of explanation, a rightward rotation with respect to the +Y direction is defined to be a + direction (a +yaw direction), and a leftward rotation with respect to the +Y direction is defined to be a − direction (a −yaw direction).

A rotation direction with a Z-direction axis as a rotary shaft is defined to be a roll direction. For convenience of explanation, a leftward rotation with respect to the +Z direction is defined to be a + direction (a +roll direction), and a rightward rotation with respect to the +Z direction is defined to be a − direction (a −roll direction).

The positive/negative (+/−) direction defined above is dependent on a mounting direction of an angular velocity sensor described later, and of course, the positive/negative (+/−) direction is not limited to the definition above.

Figure 2:
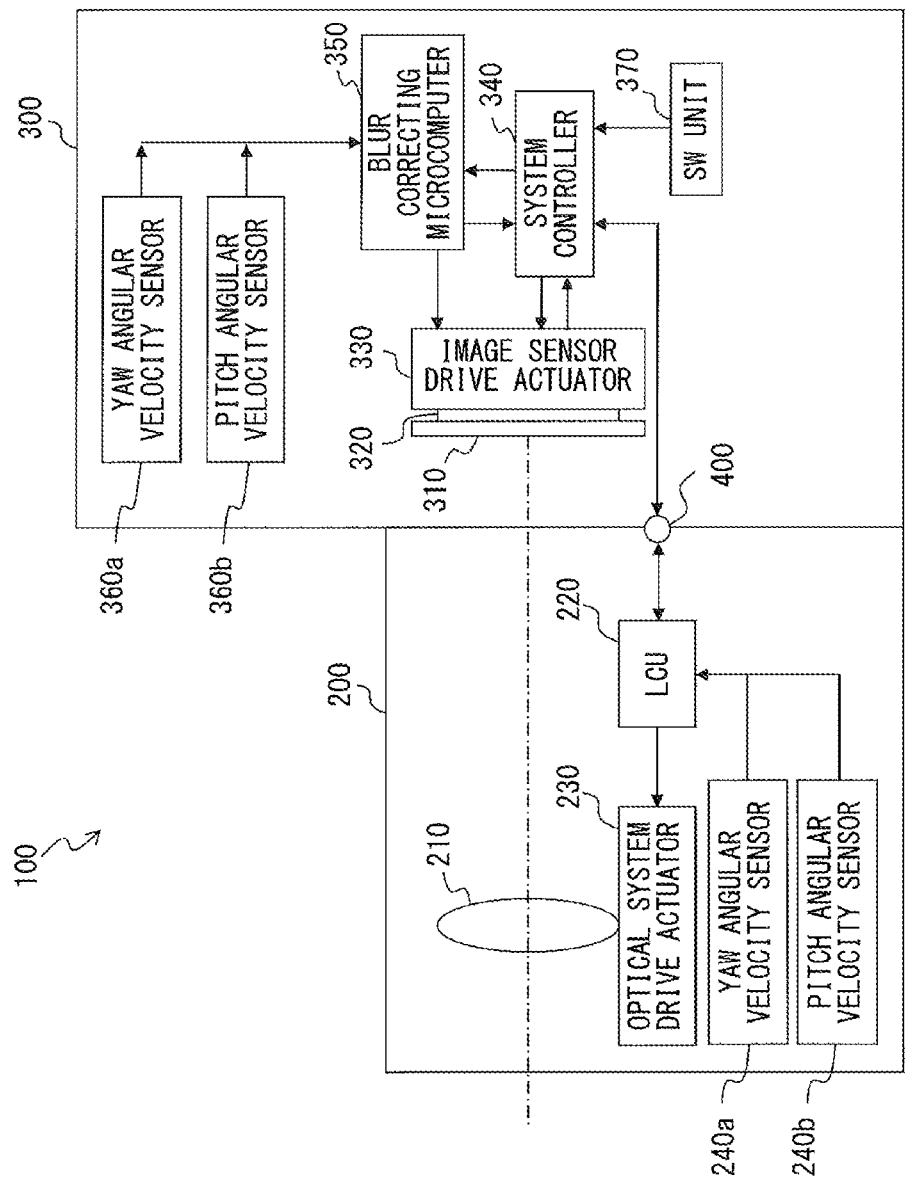
FIG. 2 illustrates an exemplary configuration of a camera system according to an embodiment.

FIG. 2 illustrates an exemplary configuration of the camera system 100 according to the embodiment.

As illustrated in FIG. 2, the camera system 100 according to the embodiment has a configuration in which the lens unit 200 is mounted onto the camera body 300. The camera body 300 is configured in such a way that the lens unit 200 can be attached to or detached from the camera body 300. The lens unit 200 is mounted onto the camera body 300 by a lens mount connector (not illustrated) provided in the lens unit 200 and a body mount connector (not illustrated) provided in the camera body 300 fitting into each other. Consequently, the lens unit 200 is fixed to the camera body 300, and terminals provided in the respective mount connectors are electrically connected to each other. Accordingly, communication can be performed between the lens unit 200 and the camera body 300 via a contact 400.

The lens unit 200 includes an optical system 210, an LCU (lens control unit) 220, an optical system drive actuator 230, a yaw angular velocity sensor 240a, and a pitch angular velocity sensor 240b.

The optical system 210 includes a blur correcting lens group, and condenses a light flux from a subject so as to form an image as a subject image on an imaging plane of an image sensor 320.

The optical system drive actuator 230 moves the blur correcting lens group that is a portion of the optical system 210 on a plane orthogonal to an optical axis, under the control of the LCU 220.

The yaw angular velocity sensor 240a detects an angular velocity in the yaw direction. The pitch angular velocity sensor 240b detects an angular velocity in the pitch direction.

The LCU 220 communicates with a system controller 340 via the contact 400, and controls the entire operation of the lens unit 200. As an example, the LCU 220 transmits information relating to the lens unit 200 to the system controller 340, or obtains, from the system controller 340, information relating to the camera body 300 or an instruction to start or finish blur correction. As another example, the LCU 220 determines whether the camera body 300 mounted onto the lens unit 200 is a camera body that can perform blur correction on the basis of the information relating to the camera body 300. In this determination, it is determined that, for example, a camera body that does not have a blur correction function, or a camera body having a blur correction function in which the blur correction function has been disabled, is not a camera body that can perform blur correction. The blur correction function can be disabled, for example, by a user operating an operating unit of a camera body (for example, a SW (switch) unit 370 described later of the camera body 300). As an example, the LCU 220 controls the optical system drive actuator 230 so as to move the blur correcting lens group in a direction in which an image blur (blurring of the subject image formed on the imaging plane of the image sensor 320) is cancelled, in accordance with the angular velocities detected by the yaw angular velocity sensor 240a and the pitch angular velocity sensor 240b. As another example, the LCU 220 performs focus control, diaphragm control, or the like. The internal configuration of the LCU 220 is described below with reference to FIG. 5.

The camera body 300 includes a focal plane shutter (hereinafter simply referred to as a "shutter") 310, an image sensor 320, an image sensor drive actuator 330, a system controller 340, a blur correcting microcomputer 350, a yaw angular velocity sensor 360a, a pitch angular velocity sensor 360b, and an SW unit 370.

The shutter 310 is arranged on a front side of the imaging plane of the image sensor 320. The shutter 310 includes an aperture blade, and the shutter 310 controls exposure time by opening or closing the aperture blade under the control of the system controller 340.

The image sensor 320 converts the subject image formed on the imaging plane via the shutter 310 with the exposure blade opened into an electric signal, and outputs the electric signal as a video signal to the system controller 340, under the control of the system controller 340.

The image sensor drive actuator 330 moves the image sensor 320 in the X direction and the Y direction that are parallel to the imaging plane, under the control of the system controller 340.

The system controller 340 communicates with the LCU 220 via the contact 400, and communicates with the blur correcting microcomputer 350, and the system controller 340 controls the entire operation of the camera body 300 and the camera system 100. As an example, the system controller 340 obtains information relating to the lens unit 200 from the LCU 220, or transmits, to the LCU 220, information relating to the camera body 300 or an instruction to start or finish blur correction. As another example, the system controller 340 determines whether the lens unit 200 mounted onto the camera body 300 is a lens unit that can perform blur correction on the basis of the information relating to the lens unit 200. In this determination, it is determined that, for example, a lens unit that does not have a blur correction function, or a lens unit having a blur correction function in which the blur correction function has been disabled, is not a lens unit that can perform blur correction. The blur correction function can be disabled, for example, by a user operating an operating unit provided in the lens unit. As an example, the system controller 340 converts the video signal output from the image sensor 320 into image data. As another example, the system controller 340 transmits, to the blur correcting microcomputer 350, a portion of the information relating to the lens unit 200 (information relating to an optical characteristic of the optical system 210, correction sensitivity, and a lens unit side blur correction range length), information relating to a camera body side blur correction range length, a determination result indicating whether the lens unit 200 is a lens unit that can perform blur correction, or an instruction to start or finish blur correction. The correction sensitivity, the lens unit side blur correction range length, and the camera body side blur correction range length are described below with reference to FIG. 4.

The blur correcting microcomputer 350 communicates with the system controller 340, and performs blur correction under the control of the system controller 340. As an example, the blur correcting microcomputer 350 obtains, from the system controller 340, a portion of the information relating to the lens unit 200 (information relating to the optical characteristic of the optical system 210, the correction sensitivity, and information relating to the lens unit side blur correction range length), information relating to the camera body side blur correction range length, a determination result indicating whether the lens unit 200 is a lens unit that can perform blur correction, or an instruction to start or finish blur correction. As another example, the blur correcting microcomputer 350 controls the image sensor drive actuator 330 so as to move the image sensor 320 in a direction in which an image blur is cancelled, in accordance with the angular velocities detected by the yaw angular velocity sensor 360a and the pitch angular velocity sensor 360b. The internal configuration of the blur correcting microcomputer 350 is described below with reference to FIG. 3.

The yaw angular velocity sensor 360a detects an angular velocity in the yaw direction. The pitch angular velocity sensor 360b detects an angular velocity in the pitch direction.

The SW unit 370 receives various instructions, such as an instruction to start photographing, from a user, and transmits the various instructions to the system controller 340.

In the camera system 100, each of the LCU 220, the system controller 340, and the blur correcting microcomputer 350 includes, for example, a CPU, a memory, and the like (not illustrated), and each of the LCU 220, the system controller 340, and the blur correcting microcomputer 350 controls the various operations described above and below by the CPU loading and executing a program stored in the memory.

In the camera system 100, all of the yaw angular velocity sensors 240a and 360a, and the pitch angular velocity sensors 240b and 360b are angular velocity sensors having the same function, but of course, they are mounted in different directions according to a detection direction.

In the camera system 100, the image sensor drive actuator 330 is an example of a blur correcting unit that performs blur correction in a plurality of directions. A portion of the system controller 340 is an example of a determining unit that determines whether a lens unit mounted onto a camera body is a lens unit that can perform blur correction in a plurality of directions. When the determining unit determines that a lens unit mounted onto a camera unit is a lens unit that can perform blur correction in a plurality of directions, the camera body performs blur correction in a plurality of direction at a camera body side blur correction ratio, and the lens unit performs blur correction in a plurality of directions at a lens unit side blur correction ratio, for example, as described below.

Figure 3:
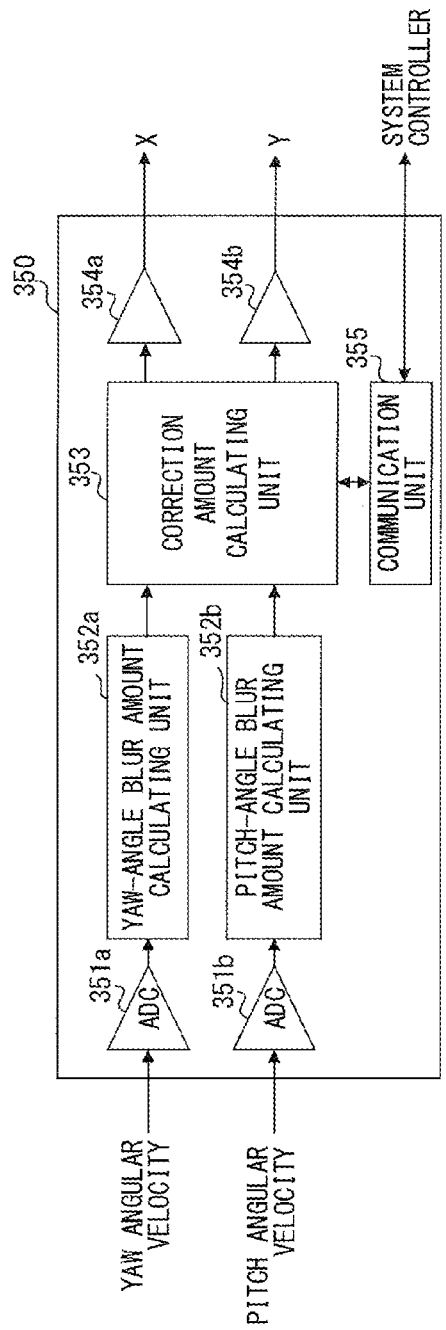
FIG. 3 illustrates an example of an internal configuration of a blur correcting microcomputer according to an embodiment.

FIG. 3 illustrates an example of the internal configuration of the blur correcting microcomputer 350.

As illustrated in FIG. 3, the blur correcting microcomputer 350 includes ADCs (analog-to-digital converters) 351a and 351b, a yaw-angle blur amount calculating unit 352a, a pitch-angle blur amount calculating unit 352b, a correction amount calculating unit 353, drivers 354a and 354b, and a communication unit 355.

The ADC 351a converts a detection result that has been output as an analog signal by the yaw angular velocity sensor 360a into a digital signal. The ADC 351b converts a detection result that has been output as an analog signal by the pitch angular velocity sensor 360b into a digital signal.

The yaw-angle blur amount calculating unit 352a calculates an image plane movement amount in the X direction (an image blur amount associated with blurring in the yaw direction) on the basis of the angular velocity in the yaw direction that is indicated by a conversion result of the ADC 351a and an optical characteristic (a focal length of the optical system 210). Alternatively, the yaw-angle blur amount calculating unit 352a calculates an image plane movement amount in the X direction according to the camera body side blur correction ratio on the basis of the angular velocity in the yaw direction that is indicated by a conversion result of the ADC 351a, the optical characteristic (the focal length of the optical system 210), the correction sensitivity, the lens unit side blur correction range length, and the camera body side blur correction range length. The internal configuration of the yaw-angle blur amount calculating unit 352a is described below with reference to FIG. 4.

The pitch-angle blur amount calculating unit 352b calculates an image plane movement amount in the Y direction (an image blur amount associated with blurring in the pitch direction) on the basis of the angular velocity in the pitch direction that is indicated by a conversion result of the ADC 351b and an optical characteristic (the focal length of the optical system 210). Alternatively, the pitch-angle blur amount calculating unit 352b calculates an image plane movement amount in the Y direction according to a camera body side blur correction ratio on the basis of the angular velocity in the pitch direction that is indicated by a conversion result of the ADC 351b, the optical characteristic (the focal length of the optical system 210), the correction sensitivity, the lens unit side blur correction range length, and the camera body side blur correction range length. The internal configuration of the pitch-angle blur amount calculating unit 352b is also described below with reference to FIG. 4.

The correction amount calculating unit 353 calculates movement amounts in the X direction and the Y direction to move the image sensor 320 in a direction in which an image blur is cancelled, on the basis of calculation results of the yaw-angle blur amount calculating unit 352a and the pitch-angle blur amount calculating unit 352b.

The driver 354a outputs, to the image sensor drive actuator 330, a driving pulse signal according to the movement amount in the X direction calculated by the correction amount calculating unit 353. The driver 354b outputs, to the image sensor drive actuator 330, a driving pulse signal according to the movement amount in the Y direction calculated by the correction amount calculating unit 353.

The communication unit 355 communicates with the system controller 340, and obtains, for example, a portion of the information relating to the lens unit 200 (information relating to the optical characteristic of the optical system 210, the correction sensitivity, and the lens unit side blur correction range length), information relating to the camera body side blur correction range length, a determination result indicating whether the lens unit 200 is a lens unit that can perform blur correction, or an instruction to start or finish blur correction.

Figure 4:
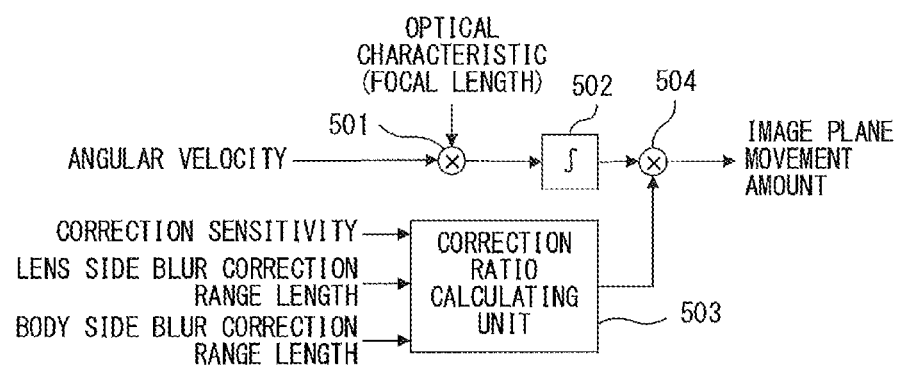
FIG. 4 illustrates an example of an internal configuration of each of a yaw-angle blur amount calculating unit and a pitch-angle blur amount calculating unit according to an embodiment.

FIG. 4 illustrates an example of an internal configuration of each of the yaw-angle blur amount calculating unit 352a and the pitch-angle blur amount calculating unit 352b.

As illustrated in FIG. 4, each of the yaw-angle blur amount calculating unit 352a and the pitch-angle blur amount calculating unit 352b includes a multiplier 501, an integrator 502, a correction ratio calculating unit 503, and a multiplier 504.

The multiplier 501 multiplies an input angular velocity by an optical characteristic (the focal length of the optical system 210). The integrator 502 time-integrates a multiplication result of the multiplier 501 so as to calculate an image plane movement amount.

The correction ratio calculating unit 503 calculates a camera body side blur correction ratio (a blur correction ratio on a camera body side) on the basis of the correction sensitivity, the lens unit side blur correction range length, and the camera body side blur correction range length, by using Expression (1) below.

$$Ratio\_b = L\_b/(L\_b + L\_l \times K)$$ Expression (1)

In this expression, Ratio_b represents a camera body side blur correction ratio, L_b represents a camera body side blur correction range length, L_l represents a lens unit side blur correction range length, and K represents a correction sensitivity.

The camera body side blur correction range length is a maximum movement range length of the image sensor 320 moved by the image sensor drive actuator 330. In the embodiment, a camera body side blur correction range length in the X direction and a camera body side blur correction range length in the Y direction have the same value.

The lens unit side blur correction range length is a maximum movement range length of the blur correcting lens group moved by the optical system drive actuator 230. The lens unit side blur correction range length may be constant regardless of a focal length, or may change according to the focal length. In the embodiment, a lens unit side blur correction range length in the X direction and a lens unit side blur correction range length in the Y direction have the same value.

The correction sensitivity is a change ratio at which an image plane movement amount (an image blur amount associated with the movement of the blur correcting lens group) changes with respect to the movement amount of the blur correcting lens group in accordance with a magnification of the optical system 210 (a magnification of an optical system in a rear stage of the blur correcting lens group). Accordingly, when the magnification of the optical system 210 changes, the correction sensitivity also changes.

According to a determination result indicating whether the lens unit 200 is a lens unit that can perform blur correction, the multiplier 504 multiplies a calculation result of the integrator 502 (the image plane movement amount) by a calculation result of the correction ratio calculating unit 503 (the camera body side blur correction ratio) so as to calculate an image plane movement amount according to the camera body side blur correction ratio. Alternatively, the multiplier 504 outputs the calculation result of the integrator 502 without performing the multiplication above.

Figure 5:
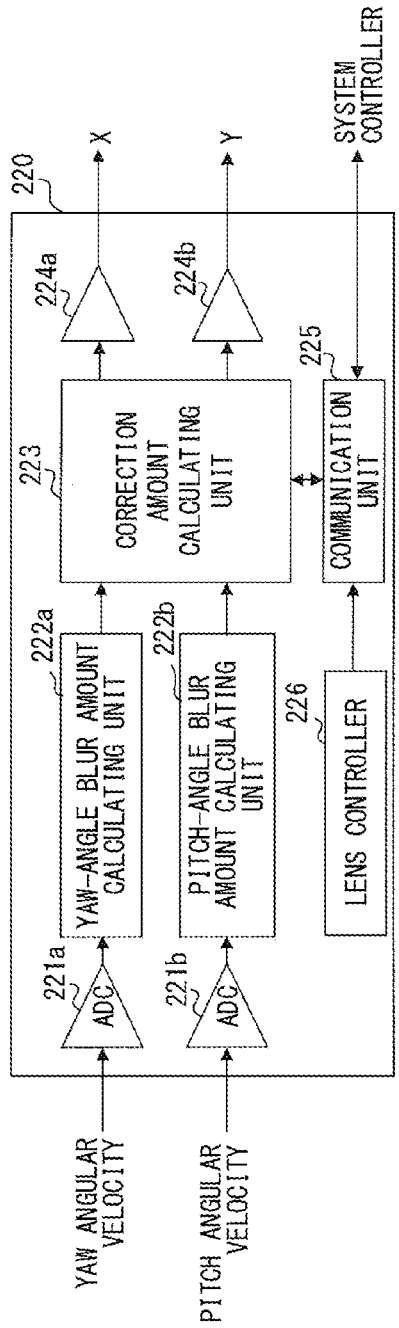
FIG. 5 illustrates an example of an internal configuration of an LCU according to an embodiment.

FIG. 5 illustrates an example of an internal configuration of the LCU 220.

As illustrated in FIG. 5, the LCU 220 includes ADCs 221a and 221b, a yaw-angle blur amount calculating unit 222a, a pitch-angle blur amount calculating unit 222b, a correction amount calculating unit 223, drivers 224a and 224b, a communication unit 225, and a lens controller 226.

The ADC 221a converts a detection result that has been output as an analog signal by the yaw angular velocity sensor 240a into a digital signal. The ADC 221b converts a detection result that has been output as an analog signal by the pitch angular velocity sensor 240b into a digital signal.

The yaw-angle blur amount calculating unit 222a calculates a movement amount in the X direction (a value obtained by converting an image blur amount associated with blurring in the yaw direction into a movement amount of the blur correcting lens group) on the basis of an angular velocity in the yaw direction indicated by a conversion result of the ADC 221a and an optical characteristic (a focal length of the optical system 210/a correction sensitivity). Alternatively, the yaw-angle blur amount calculating unit 222a calculates a movement amount in the X direction according to a lens unit side blur correction ratio on the basis of the angular velocity in the yaw direction indicated by the conversion result of the ADC 221a, the optical characteristic (the focal length of the optical system 210/the correction sensitivity), the correction sensitivity, the lens unit side blur correction range length, and the camera body side blur correction range length.

The pitch-angle blur amount calculating unit 222b calculates a movement amount in the Y direction (a value obtained by converting an image blur amount associated with blurring in the pitch direction into a movement amount of the blur correcting lens group) on the basis of an angular velocity in the pitch direction indicated by a conversion result of the ADC 221b and an optical characteristic (the focal length of the optical system 210/the correction sensitivity). Alternatively, the pitch-angle blur amount calculating unit 222b calculates a movement amount in the Y direction according to the lens unit side blur correction ratio on the basis of the angular velocity in the pitch direction indicated by the conversion result of the ADC 221b, the optical characteristic (the focal length of the optical system 210/the correction sensitivity), the correction sensitivity, the lens unit side blur correction range length, and the camera body side blur correction range length.

Respective internal configurations of the yaw-angle blur amount calculating unit 222a and the pitch-angle blur amount calculating unit 222b are basically the same as the configuration illustrated in FIG. 4, but they are different from the configuration illustrated in FIG. 4 in the following respect.

In the multiplier 501, an optical characteristic by which an input angular velocity is multiplied is not the focal length of the optical system 210 but an optical characteristic calculated according to Expression (2) below.

$$OP=f/K \qquad \text{Expression (2)}$$

In this expression, OP represents an optical characteristic, f represents a focal length of the optical system 210, and K represents a correction sensitivity, as described above.

The reason why the value above is used as an optical characteristic is that an image plane movement amount changes with respect to a movement amount of the blur correcting lens group at a change ratio indicated by a correction sensitivity, as described above.

In the correction ratio calculating unit 503, a lens unit side blur correction ratio (a blur correction ratio on a lens unit side) is calculated by using Expression (3) below.

$$\text{Ratio\_l} = L\_l \times K / (L\_b + L\_l \times K) \qquad \text{Expression (3)}$$

In this expression, Ratio_l represents a lens unit side blur correction ratio, L_b, L_l, and K respectively represent a camera body side blur correction range length, a lens unit side blur correction range length, and a correction sensitivity, as described above.

According to a determination result indicating whether the camera body 300 is a camera body that can perform blur correction, the multiplier 504 multiplies a calculation result of the integrator 502 (the movement amount) by a calculation result of the correction ratio calculating unit 503 (the lens unit side blur correction ratio) so as to calculate a movement amount according to the lens unit side blur correction ratio. Alternatively, the multiplier 504 outputs the calculation result of the integrator 502 without performing the multiplication above.

The other configuration is similar to the configuration illustrated in FIG. 4.

The correction amount calculating unit 223 calculates movement amounts in the X direction and the Y direction to move the blur correcting lens group in a direction in which an image blur is cancelled, on the basis of the calculation results of the yaw-angle blur amount calculating unit 222a and the pitch-angle blur amount calculating unit 222b.

The driver 224a outputs, to the optical system drive actuator 230, a driving pulse signal according to the movement amount in the X direction that has been calculated by the correction amount calculating unit 223. The driver 224b outputs, to the optical system drive actuator 230, a driving pulse signal according to the movement amount in the Y direction that has been calculated by the correction amount calculating unit 223.

The communication unit 225 communicates with the system controller 340 so as to, for example, transmit information relating to the lens unit 200, or obtain information relating to the camera body 300 (including information relating to the camera body side blur correction range length) or an instruction to start or finish blur correction.

The lens controller 226 controls the entire operation of the LCU 220 (the lens unit 200). As an example, the lens controller 226 performs control to transmit the information relating to the lens unit 200 to the system controller 340. As another example, the lens controller 226 performs control to, for example, transmit, to the yaw-angle blur amount calculating unit 222a and the pitch-angle blur amount calculating unit 222b, information relating to an optical characteristic (f/K described above) of the optical system 210, a portion of the information relating to the camera body 300 (information relating to the camera body side blur correction range length), and information relating to the lens unit side blur correction range length or the correction sensitivity. As yet another example, the lens controller 226 performs focus control, diaphragm control, and the like.

A blur correction operation of the camera system 100 according to the embodiment is described next.

The blur correction operation is performed under the control of the system controller 340. During a period after an instruction to start blur correction is issued from the system controller 340 to the lens unit 200 and the camera body 300 and before an instruction to finish blur correction is issued, the following blur correction operations are respectively performed by the lens unit 200 and the camera body 300. Here, a blur correction operation performed by the camera body 300 is described first, and a blur correction operation performed by the lens unit 200 is described next.

Figure 6:
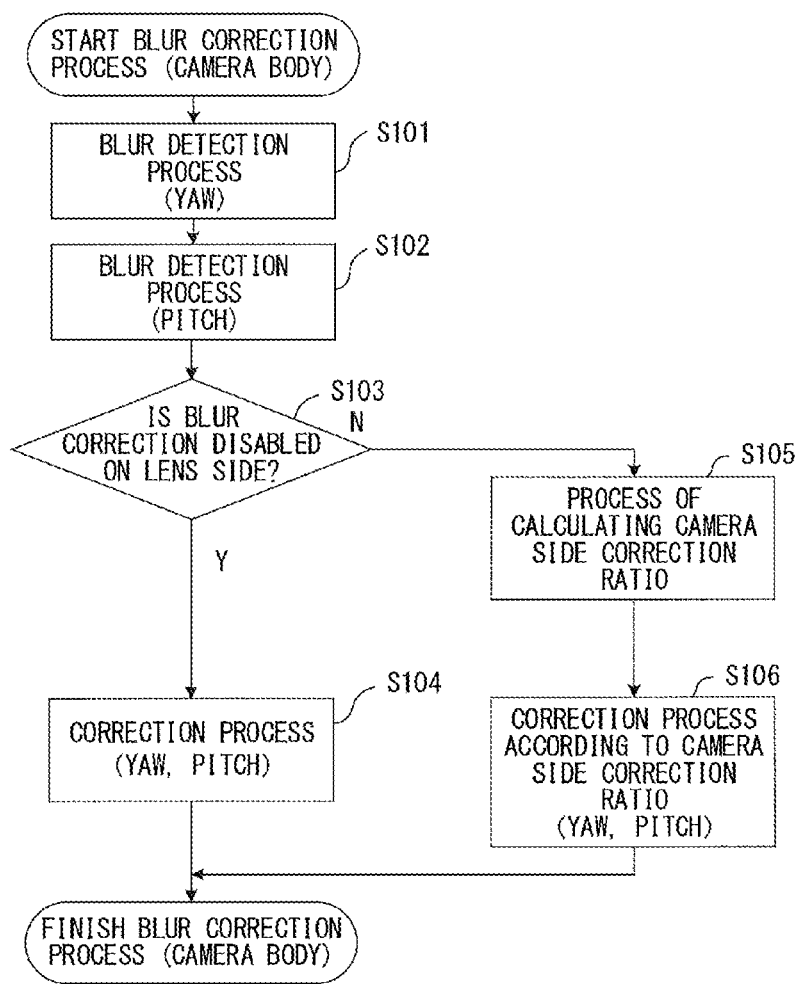
FIG. 6 is a flowchart illustrating the processing content of a blur correction operation performed by a camera body according to an embodiment.

FIG. 6 is a flowchart illustrating the processing content of the blur correction operation performed by the camera body 300.

As illustrated in FIG. 6, the blur correcting microcomputer 350 that has received an instruction to start blur correction first performs a blur detection process in the yaw direction (S101). More specifically, the blur correcting microcomputer 350 calculates an image plane movement amount in the X direction (an image blur amount associated with blurring in the yaw direction) on the basis of a detection result of the yaw angular velocity sensor 360a by using the ADC 351a, and the multiplier 501 and the integrator 502 in the yaw-angle blur amount calculating unit 352a.

Then, the blur correcting microcomputer 350 performs a blur detection process in the pitch direction (S102). More specifically, the blur correcting microcomputer 350 calculates an image plane movement amount in the Y direction (an image blur amount associated with blurring in the pitch direction) on the basis of a detection result of the pitch angular velocity sensor 360b by using the ADC 351b, and the multiplier 501 and the integrator 502 in the pitch-angle blur amount calculating unit 352b.

The blur correcting microcomputer 350 then determines whether the lens unit 200 mounted onto the camera body 300 is a lens unit in which blur correction has been disabled (S103). This determination is performed according to a determination result transmitted from the system controller 340 indicating whether the lens unit 200 is a lens unit that can perform blur correction in the yaw direction and the pitch direction. Stated another way, when the determination result transmitted from the system controller 340 indicates that the lens unit 200 is a lens unit that can perform blur correction in the yaw direction and the pitch direction, the determination result in S103 is No. When the determination result transmitted from the system controller 340 indicates that the lens unit 200 is not a lens unit that can perform blur correction in the yaw direction and the pitch direction, the determination result in S103 is Yes.

When the determination result in S103 is Yes, the blur correcting microcomputer 350 performs a blur correction process on the basis of the calculation results in S101 and S102 (S104). More specifically, the blur correcting microcomputer 350 outputs, to the image sensor drive actuator 330, a driving pulse signal according to the movement amounts in the X direction and the Y direction on the basis of the calculation results, by using the correction amount calculating unit 353 and the drivers 354$a$ and 354$b$, and in response to the driving pulse signal, the image sensor drive actuator 330 moves the image sensor 320. In this case, each of the yaw-angle blur amount calculating unit 352$a$ and the pitch-angle blur amount calculating unit 352$b$ outputs the calculation result of the integrator 502 to the correction amount calculating unit 353 without performing multiplication using the multiplier 504.

When the determination result in S103 is No, the blur correcting microcomputer 350 performs a process of calculating a camera body side blur correction ratio (S105). More specifically, the blur correcting microcomputer 350 causes the correction ratio calculating unit 503 to calculate a camera body side blur correction ratio on the basis of the correction sensitivity, the lens unit side blur correction range length, and the camera body side blur correction range length by using Expression (1) above. The blur correcting microcomputer 350 then performs a blur correction process according to the camera body side blur correction ratio on the basis of the calculation results in S101 and S102 and the calculation result in S105 (S106). More specifically, the blur correcting microcomputer 350 causes the multiplier 504 to multiply each of the calculation results in S101 and S102 by the calculation result in S105, and the blur correcting microcomputer 350 causes the correction amount calculating unit 353 and the drivers 354$a$ and 354$b$ to output, to the image sensor drive actuator 330, a driving pulse signal that corresponds to the movement amounts in the X direction and the Y direction according to the camera body side blur correction ratio on the basis of the calculation result. In response to the driving pulse signal, the image sensor drive actuator 330 moves the image sensor 320.

When the process of S104 or S106 is completed, the processing is terminated.

The processing illustrated in FIG. 6 represents a blur correction operation in one cycle performed by the camera body 300. Actually, the blur correction operation in one cycle is repeated until an instruction to finish blur correction is issued from the system controller 340 to the blur correcting microcomputer 350.

Figure 7:
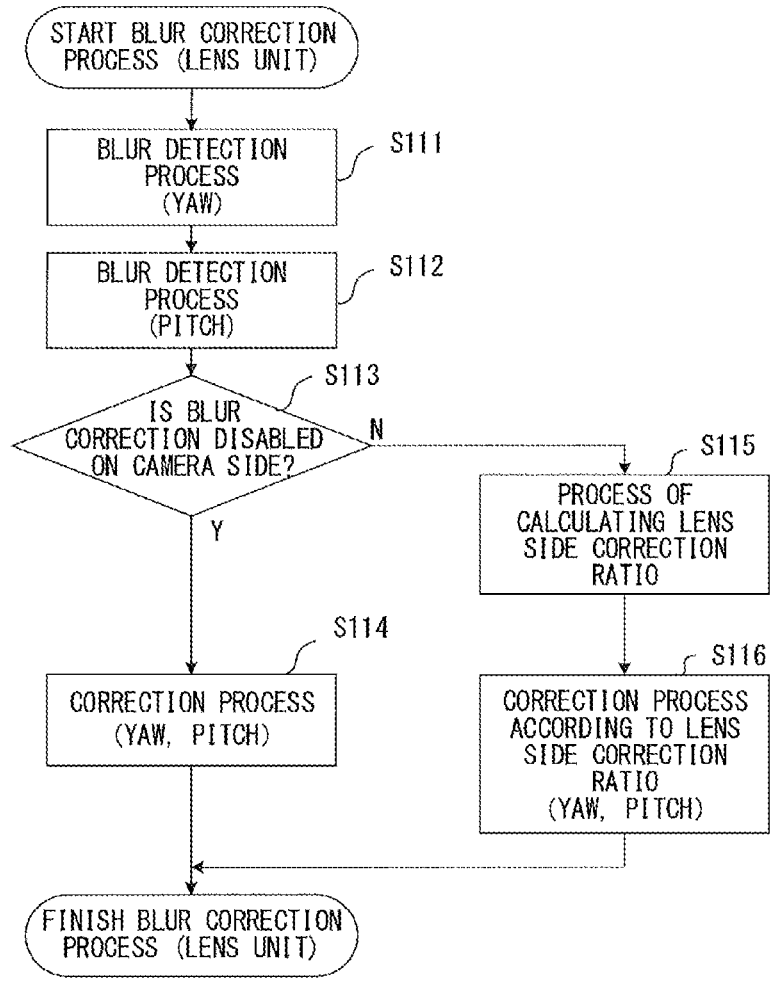
FIG. 7 is a flowchart illustrating the processing content of a blur correction operation performed by a lens unit according to an embodiment.

FIG. 7 is a flowchart illustrating the processing content of the blur correction operation performed by the lens unit 200.

As illustrated in FIG. 7, the LCU 220 that has received an instruction to start blur correction first performs a blur detection process in the yaw direction (S111). More specifically, the LCU 220 calculates a movement amount in the X direction (a value obtained by converting an image blur amount associated with blurring in the yaw direction into a movement amount of the blur correcting lens group) on the basis of a detection result of the yaw angular velocity sensor 240$a$, by using the ADC 221$a$, and the multiplier 501 and the integrator 502 in the yaw-angle blur amount calculating unit 222$a$.

Then, the LCU 220 performs a blur detection process in the pitch direction (S112). More specifically, the LCU 220 calculates a movement amount in the Y direction (a value obtained by converting an image blur amount associated with blurring in the pitch direction into a movement amount of the blur correcting lens group) on the basis of a detection result of the pitch angular velocity sensors 240$b$, by using the ADC 221$b$, and the multiplier 501 and the integrator 502 in the pitch-angle blur amount calculating unit 222$b$.

The LCU 220 then determines whether the camera body 300 mounted onto the lens unit 200 is a camera body in which blur correction has been disabled (S113). This determination is performed according to information relating to the camera body 300 that has been transmitted from the system controller 340. More specifically, when the information indicates that the camera body 300 is a camera body that can perform blur correction in the yaw direction and the pitch direction, the determination result in S113 is No. Otherwise, the determination result in S113 is Yes.

When the determination result in S113 is Yes, the LCU 220 performs a blur correction process on the basis of the calculation results in S111 and S112 (S114). More specifically, the LCU 220 causes the correction amount calculating unit 223 and the drivers 224$a$ and 224$b$ to output, to the optical system drive actuator 230, a driving pulse signal according to the movement amounts in the X direction and the Y direction on the basis of the calculation result. In response to the driving pulse signal, the optical system drive actuator 230 moves the blur correcting lens group. In this case, each of the yaw-angle blur amount calculating unit 222$a$ and the pitch-angle blur amount calculating unit 222$b$ outputs a calculation result of the integrator 502 to the correction amount calculating unit 223 without performing multiplication using the multiplier 504.

When the determination result in S103 is No, the LCU 220 performs a process of calculating a lens unit side blur correction ratio (S115). More specifically, the LCU 220 causes the correction ratio calculating unit 503 to calculate a lens unit side blur correction ratio on the basis of the correction sensitivity, the lens unit side blur correction range length, and the camera body side blur correction range length, by using Expression (3) above. The LCU 220 performs a blur correction process according to the lens unit side blur correction ratio on the basis of the calculation results in S111 and S112 and the calculation result in S115 (S116). More specifically, the LCU 220 causes the multiplier 504 to multiply each of the calculation results in S111 and S112 by the calculation result in S115, and the LCU 220 causes the correction amount calculating unit 223 and the drivers 224$a$ and 224$b$ to output, to the optical system drive actuator 230, a driving pulse signal that corresponds to the movement amounts in the X direction and the Y direction according to the lens unit side blur correction ratio on the basis of the calculation result. In response to the driving pulse signal, the optical system drive actuator 230 moves the blur correcting lens group.

When the process of S114 or S116 is completed, the processing is terminated.

The processing illustrated in FIG. 7 represents a blur correction operation in one cycle performed by the lens unit 200. Actually, the blur correction operation in one cycle is repeated until an instruction to finish blur correction is issued from the system controller 340 to the LCU 220.

In the camera system 100 according to the embodiment, when the lens unit 200 that can perform blur correction in the yaw direction and the pitch direction is mounted onto the camera body 300 that can perform blur correction in the yaw direction and the pitch direction, blur correction is performed by the lens unit 200 and the camera body 300 at a blur correction ratio based on a ratio of the camera body side blur correction range length to the lens unit side blur correction range length, and blur correction ranges on a camera body side and a lens unit side are used up effectively.

Accordingly, a problem as in a conventional technology does not occur wherein either the blur correction range on the camera body side or the blur correction range on the lens unit side reaches a limit, and therefore blur correction cannot be performed any further. A blur correction range in the entirety of a camera system can increase, and this allows a blur correction performance to be improved.

Various variations to the camera system 100 according to the embodiment can be made.

As an example, each of the yaw-angle blur amount calculating unit 352a and the pitch-angle blur amount calculating unit 352b is configured to time-integrate a value obtained by multiplying an input angular velocity by an optical characteristic and to multiply the time-integrated value by a blur correction ratio, as illustrated in FIG. 4 (the same applies to each of the yaw-angle blur amount calculating unit 222a and the pitch-angle blur amount calculating unit 222b). However, an operation order is not limited to this. If a finally calculated value is the same, as an example, an input angular velocity, an optical characteristic, and a blur correction ratio may be multiplied before time-integration, or the input angular velocity may be multiplied by a value obtained by multiplying the optical characteristic by the blur correction ratio.

As another example, in the camera system 100 according to the embodiment, a camera body side blur correction ratio is calculated on a camera body side, and a lens unit side blur correction ratio is calculated on a lens unit side. However, the lens unit side blur correction ratio and the camera body side blur correction ratio may be calculated on the camera body side or the lens unit side, as described below with reference to FIGS. 8 to 11.

Figure 8:
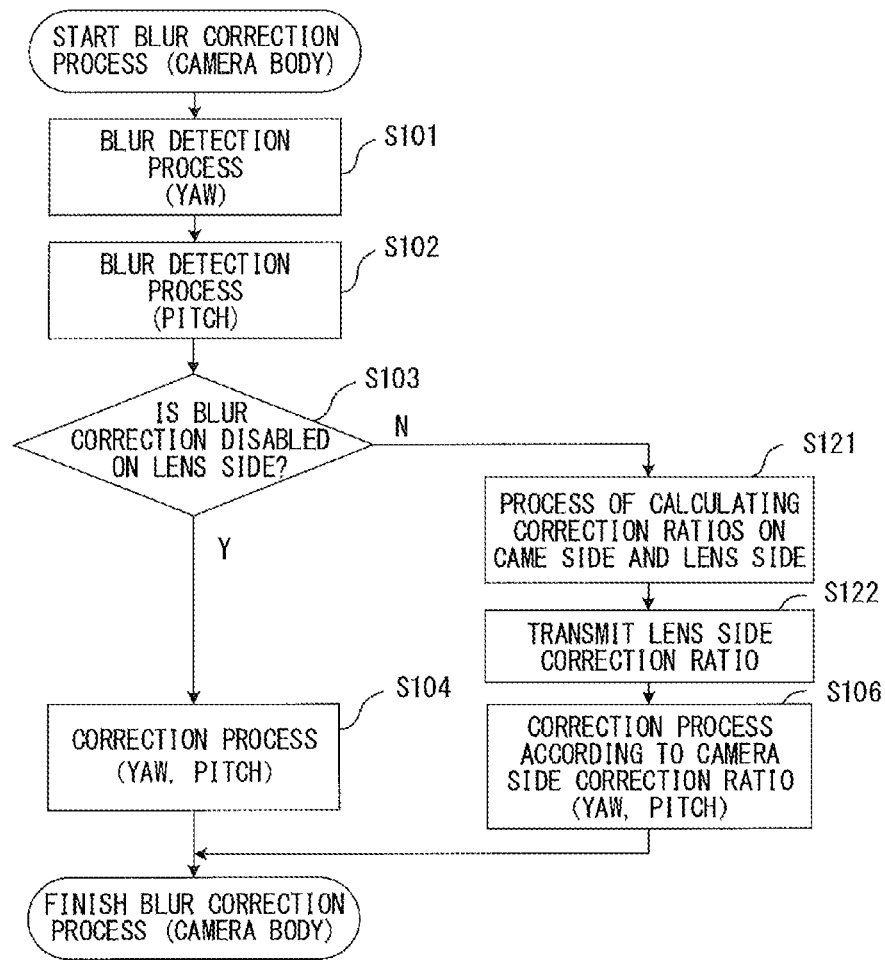
FIG. 8 is a flowchart illustrating the processing content of a blur correction operation performed by a camera body according to a variation of the embodiment.
Figure 9:
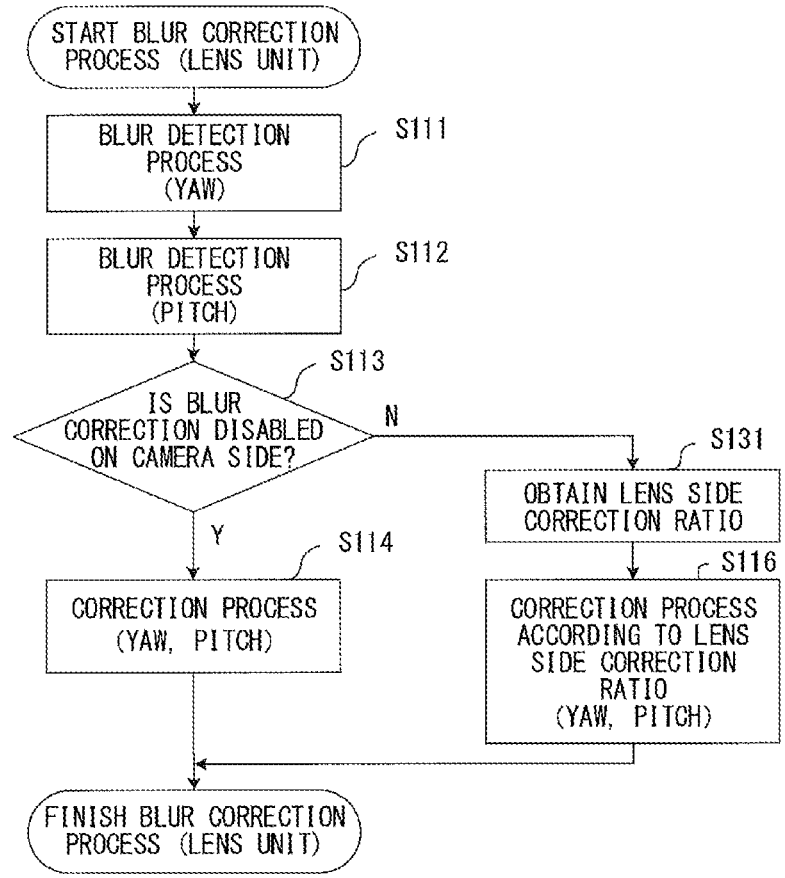
FIG. 9 is a flowchart illustrating the processing content of a blur correction operation performed by a lens unit according to a variation of the embodiment.

FIGS. 8 and 9 are flowcharts illustrating an example of the processing content of a blur correction operation performed by the camera system 100 in a case in which a lens unit side blur correction ratio and a camera body side blur correction ratio are calculated on a camera body side. In the flowchart illustrated in FIG. 8, the process of S105 in the flowchart illustrated in FIG. 6 is replaced with the processes of S121 and S122. In the flowchart illustrated in FIG. 9, the process of S115 in the flowchart illustrated in FIG. 7 is replaced with the process of S131. Only the replaced processes are described here, and the description of the other processes are omitted.

As illustrated in FIG. 8, in the camera body 300, when the determination result in S103 is No, the blur correcting microcomputer 350 performs a process of calculating a lens unit side blur correction ratio and a camera body side blur correction ratio (S121). More specifically, the blur correcting microcomputer 350 first performs a process similar to the process of S105 in FIG. 6 so as to calculate a camera body side blur correction ratio, and calculates a lens unit side blur correction ratio by subtracting the camera body side blur correction ratio from 1. The blur correcting microcomputer 350 then transmits the lens unit side blur correction ratio calculated in S121 to the LCU 220 via the system controller 340 (S122). More specifically, the blur correcting microcomputer 350 transmits the lens unit side blur correction ratio to the system controller 340, and the system controller 340 transmits the lens unit side blur correction ratio to the LCU 220. In S106, a blur correction process is performed at the camera body side blur correction ratio calculated in S121.

As illustrated in FIG. 9, in the lens unit 200, when the determination result in S113 is No, the LCU 220 obtains the lens unit side blur correction ratio transmitted from the system controller 340 (S131). In S116, a blur correction process is performed at the lens unit side blur correction ratio obtained in S131.

By performing the blur correction operation above in the camera system 100, as an example, in the LCU 220, each of the yaw-angle blur amount calculating unit 222a and the pitch-angle blur amount calculating unit 222b does not need to include the correction ratio calculating unit 503. Accordingly, a simpler configuration can be employed, and an operation load can be reduced.

Figure 10:
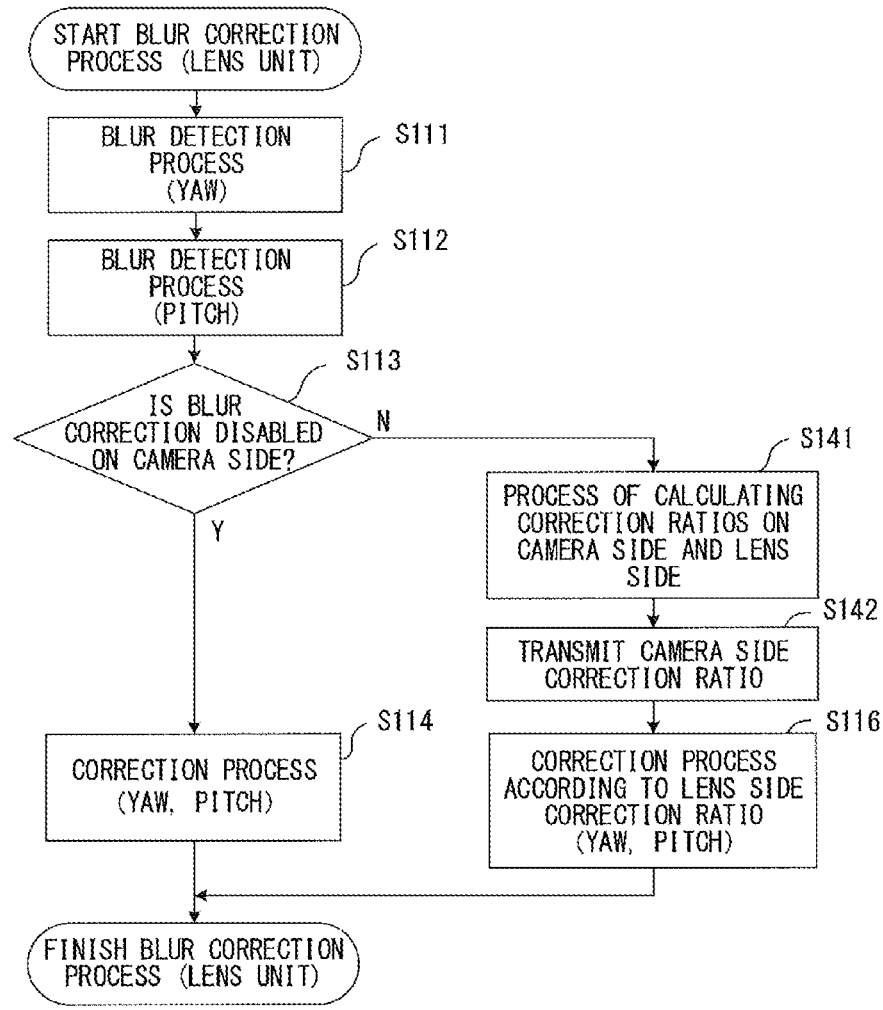
FIG. 10 is a flowchart illustrating the processing content of a blur correction operation performed by a lens unit according to another variation of the embodiment.
Figure 11:
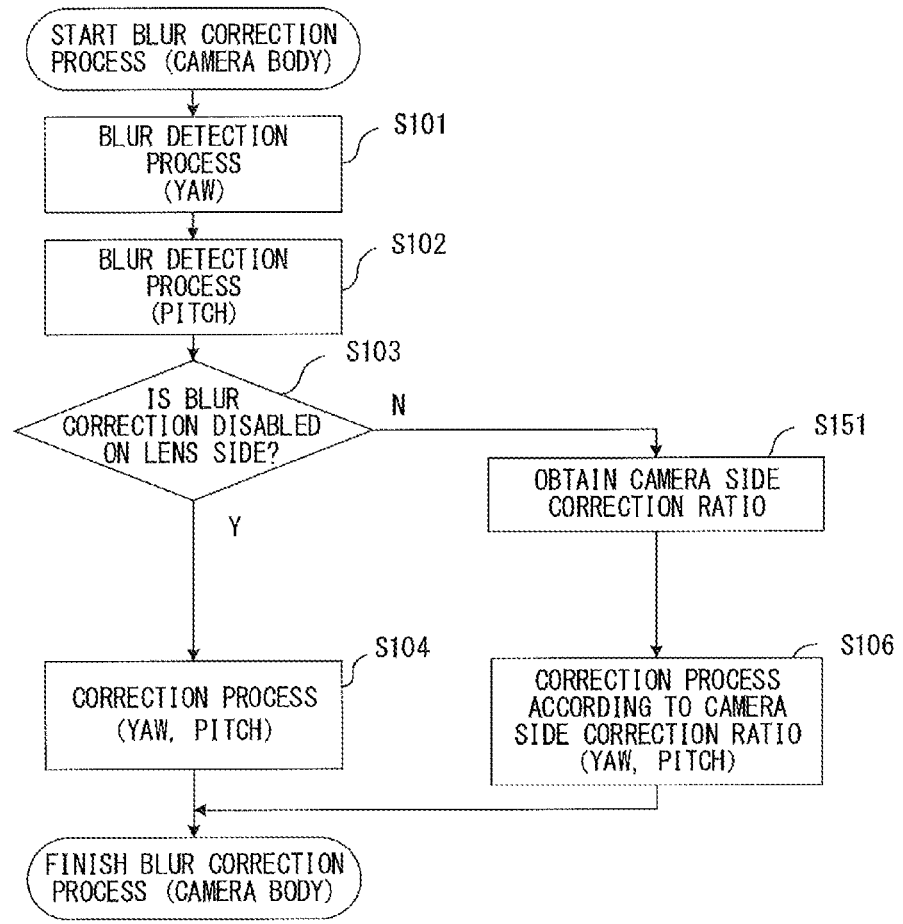
FIG. 11 is a flowchart illustrating the processing content of a blur correction operation performed by a camera body according to another variation of the embodiment.

FIGS. 10 and 11 are flowcharts illustrating an example of the processing content of a blur correction operation performed by the camera system 100 in a case in which a lens unit side blur correction ratio and a camera body side blur correction ratio are calculated on a lens unit side. In the flowchart illustrated in FIG. 10, the process of S115 in the flowchart illustrated in FIG. 7 is replaced with the processes of S141 and S142. In the flowchart illustrated in FIG. 11, the process of S105 in the flowchart illustrated in FIG. 6 is replaced with the process of S151. Only the replaced processes are described here, and the description of the other processes is omitted.

As illustrated in FIG. 10, in the lens unit 200, when the determination result in S113 is No, the LCU 220 performs a process of calculating a lens unit side blur correction ratio and a camera body side blur correction ratio (S141). More specifically, the LCU 220 first performs a process similar to the process of S115 in FIG. 7 so as to calculate a lens unit side blur correction ratio, and calculates a camera body side blur correction ratio by subtracting the lens unit side blur correction ratio from 1. The LCU 220 transmits the camera body side blur correction ratio calculated in S141 to the blur correcting microcomputer 350 via the system controller 340 (S142). More specifically, the LCU 220 transmits the camera body side blur correction ratio to the system controller 340, and the system controller 340 transmits the camera body side blur correction ratio to the blur correcting microcomputer 350. In S116, a blur correction process is performed at the lens unit side blur correction ratio calculated in S141.

As illustrated in FIG. 11, in the camera body 300, when the determination result in S103 is No, the blur correcting microcomputer 350 obtains the camera body side blur correction ratio transmitted from the system controller 340 (S151). In S106, a blur correction process is performed at the lens unit side blur correction ratio obtained in S151.

By performing the blur correction operation above in the camera system 100, as an example, in the blur correcting microcomputer 350, each of the yaw-angle blur amount calculating unit 352a and the pitch-angle blur amount calculating unit 352b does not need to include the correction ratio calculating unit 503. Accordingly, a simpler configuration can be employed, and an operation load can be reduced.

The embodiment above describes a specific example of the present invention in order to easily understand the invention, and the present invention is not limited to the embodiment above. Various variations or modifications of the present invention can be made without departing from the spirit of the present invention specified in the claims.

As described above, according to the present invention, a camera system can be provided in which, when both a lens unit and a camera body have a blur correction function, both the lens unit and the camera body perform blur correction at a blur correction ratio at which blur correction ranges of both the lens unit and the camera body are used up effectively such that a blur correction range in the entirety of a camera system can increase and a blur correction performance can be improved.

What is claimed is:

1. A camera system that includes a lens unit and a camera body that the lens unit is freely attached to or detached from, wherein
the camera body includes:
a blur corrector that performs blur correction in a plurality of directions; and
a determiner that determines whether the lens unit mounted onto the camera body is a lens unit that performs the blur correction in the plurality of directions,
when the determiner determines that the lens unit mounted onto the camera body is the lens unit that performs the blur correction in the plurality of directions, the camera body drives the blur corrector so as to perform the blur correction in the plurality of directions at a camera body side blur correction ratio based on information relating to a blur correction range that the lens unit has, a correction sensitivity, and the blur correction range included in the camera body, and the lens unit performs the blur correction at a lens unit side blur correction ratio based on the information relating to the blur correction range that the lens unit has, the correction sensitivity, and the blur correction range included in the camera body, and
when $L\_b$ represents the blur correction range included in the camera body, $L\_l$ represents the blur correction range that the lens unit has, and $K$ represents the correction sensitivity, the camera body side blur correction ratio is a value obtained by performing an operation of $L\_b/(L\_b+L\_l \times K)$, and the lens unit side blur correction ratio is a value obtained by performing an operation of $L\_l \times K/(L\_b+L\_l \times K)$.

2. The camera system according to claim 1, wherein
the camera body further includes a first correction ratio calculator that calculates the camera body side blur correction ratio, and
the lens unit further includes a second correction ratio calculator that calculates the lens unit side blur correction ratio.

3. The camera system according to claim 1, wherein
the camera body further includes a correction ratio calculator on a camera body side that calculates the camera body side blur correction ratio and the lens unit side blur correction ratio, and
the camera body transmits, to the lens unit, the lens unit side blur correction ratio calculated by the correction ratio calculator on the camera body side.

4. The camera system according to claim 1, wherein
the lens unit further includes a correction ratio calculator on a lens unit side that calculates the camera body side blur correction ratio and the lens unit side blur correction ratio, and
the lens unit transmits, to the camera body, the camera body side blur correction ratio calculated by the correction ratio calculator on the lens unit side.

5. The camera system according to claim 1, wherein
the plurality of directions are two directions, a yaw direction and a pitch direction that are respectively rotation directions having axes in directions perpendicular to optical axis directions of the lens unit and the camera body.

* * * * *